(12) United States Patent
Vogel

(10) Patent No.: US 8,433,494 B2
(45) Date of Patent: Apr. 30, 2013

(54) OPERATING DEVICE FOR A CRUISE CONTROL SYSTEM IN A VEHICLE WITH REGENERATIVE BRAKING CAPABILITY

(75) Inventor: Thomas Vogel, Griesheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 851 days.

(21) Appl. No.: 12/502,955

(22) Filed: Jul. 14, 2009

(65) Prior Publication Data

US 2011/0015812 A1    Jan. 20, 2011

(51) Int. Cl.
*B60T 8/32*  (2006.01)
*G05D 1/00*  (2006.01)
*G06F 7/00*  (2006.01)
*G06F 17/00* (2006.01)

(52) U.S. Cl.
USPC .......... 701/93; 701/1; 701/94; 701/110

(58) Field of Classification Search .......... 303/121, 303/124, 132, 138–152, 183, 192, 199, 20; 318/53–97, 101–104, 140–158, 727–832, 318/362–382; 388/931–932; 310/12.12, 310/94–98, 102 R; 188/266–267, 156–164; 104/287–289; 477/2–3, 7, 9, 14, 20, 27, 477/182–189; 180/170, 65.1, 65.21, 65.22, 180/65.225, 65.23, 65.235, 65.24; 903/902–960; 701/22

See application file for complete search history.

(56) References Cited

U.S. PATENT DOCUMENTS

| | | | | | |
|---|---|---|---|---|---|
| 4,363,999 | A | * | 12/1982 | Preikschat | 318/53 |
| 4,632,205 | A | * | 12/1986 | Lewis | 180/165 |
| 5,081,365 | A | * | 1/1992 | Field et al. | 290/45 |
| 5,125,471 | A | * | 6/1992 | Iwaoka et al. | 180/179 |
| 5,615,933 | A | * | 4/1997 | Kidston et al. | 303/152 |
| 5,627,438 | A | * | 5/1997 | Barrett | 318/139 |
| 5,799,262 | A | * | 8/1998 | Suzuki | 701/93 |
| 5,823,280 | A | * | 10/1998 | Lateur et al. | 180/65.235 |
| 5,845,726 | A | * | 12/1998 | Kikkawa et al. | 180/178 |
| 6,059,064 | A | * | 5/2000 | Nagano et al. | 180/243 |
| 6,122,588 | A | * | 9/2000 | Shehan et al. | 701/93 |

\* cited by examiner

*Primary Examiner* — Khoi Tran
*Assistant Examiner* — Bhavesh V Amin
(74) *Attorney, Agent, or Firm* — John A. Miller; Miller IP Group, PLC

(57) ABSTRACT

A method for controlling the speed of a vehicle having a regenerative or active braking capacity when the vehicle is traveling downhill using a cruise control system on the vehicle. When brake pedal is applied and the cruise control is set, the vehicle is put into a controlled braking mode. The cruise control system controls are then used inversely to the normal operation where decreases in vehicle speed are provided by applying motoring torque. For the inversed cruise control, increasing the vehicle speed is prohibited by applying more regenerative braking torque.

19 Claims, 3 Drawing Sheets

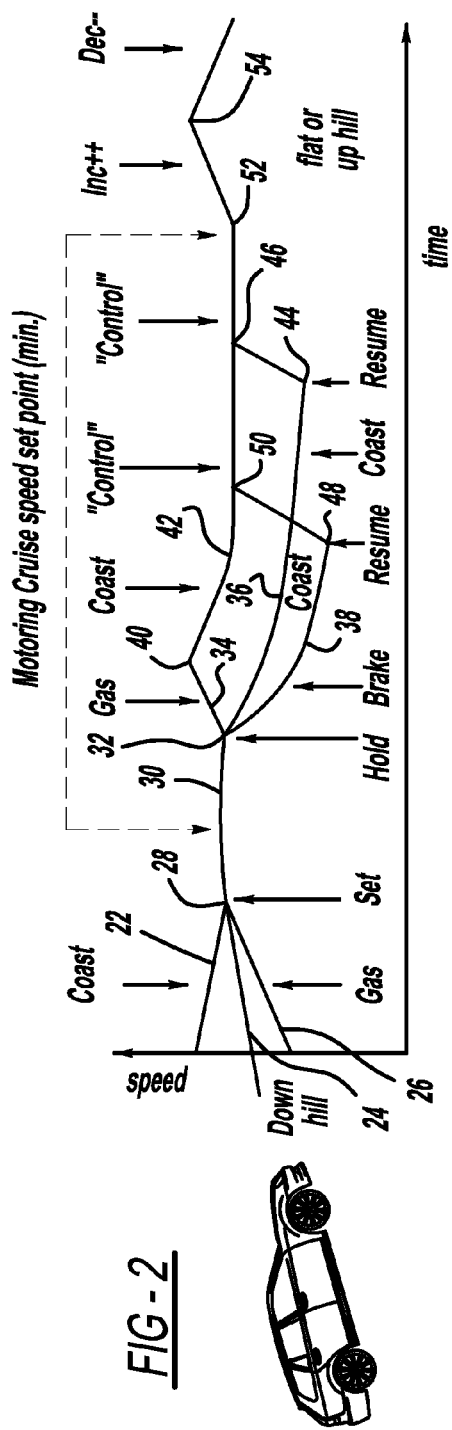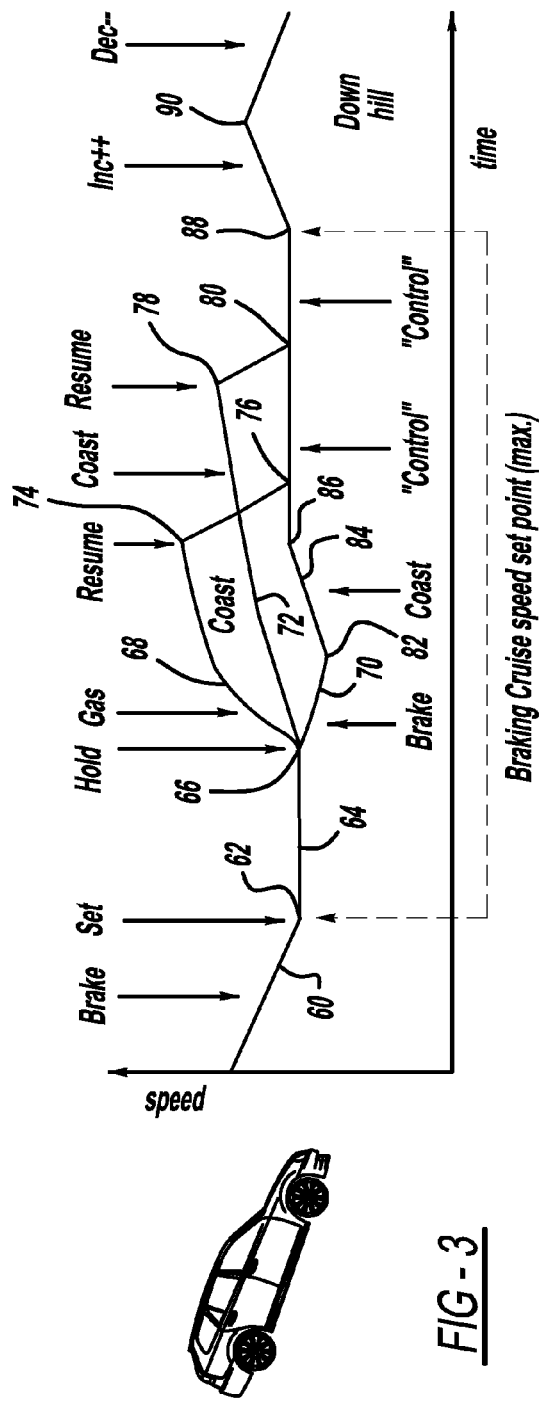

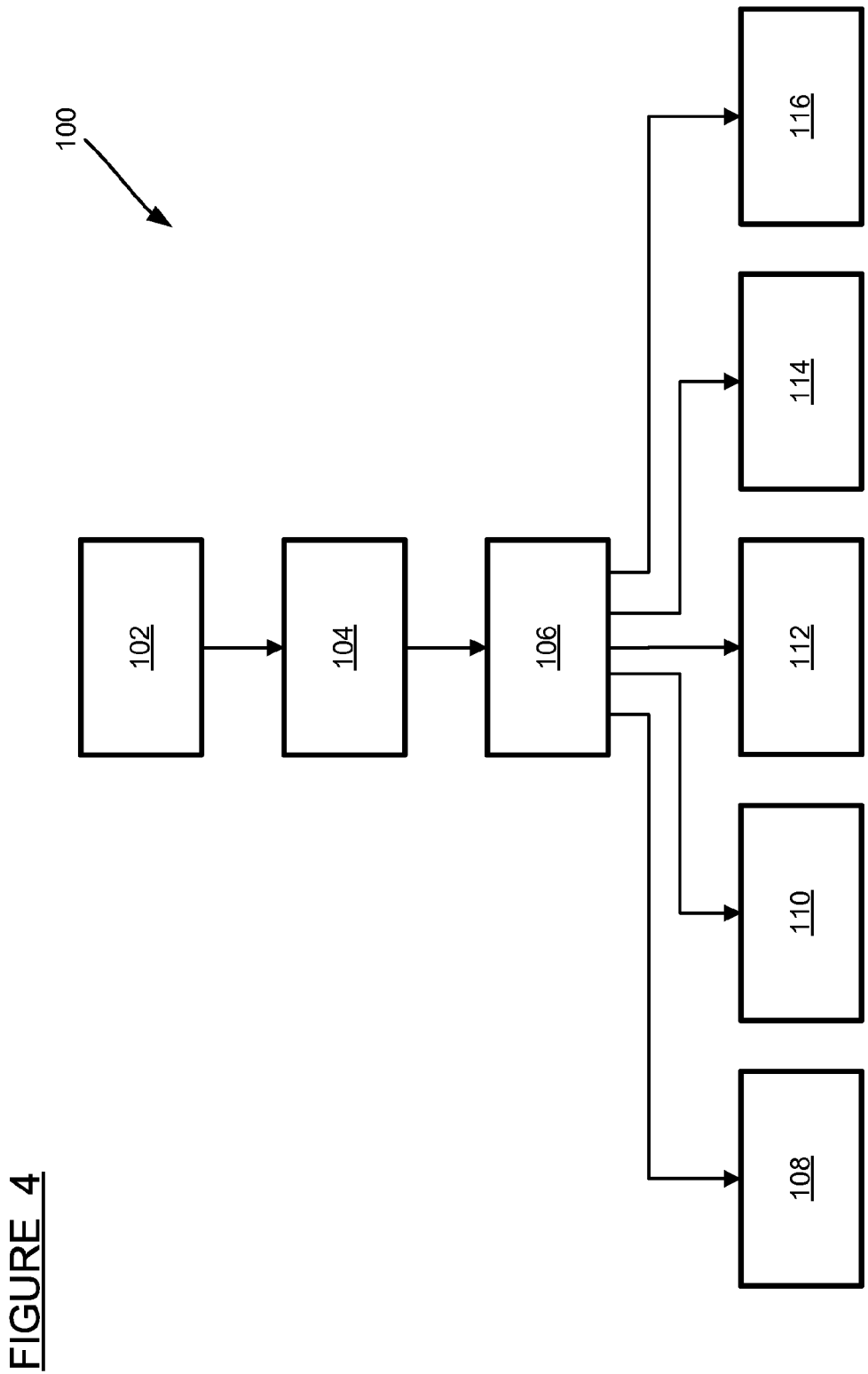

OPERATING DEVICE FOR A CRUISE CONTROL SYSTEM IN A VEHICLE WITH REGENERATIVE BRAKING CAPABILITY

BACKGROUND OF THE INVENTION

1. Field of the Invention

This invention relates generally to a method for controlling the speed of a vehicle traveling downhill that has a regenerative braking capability and, more particularly, to a method for controlling the speed of a vehicle traveling downhill that has a regenerative braking capability by using a cruise control system of the vehicle.

2. Discussion of the Related Art

Fuel cell, battery electric and hybrid vehicles employ a supplemental power source, such as a high voltage DC battery, an ultracapacitor and/or a flywheel. The supplemental power source provides supplemental power for the various vehicle auxiliary loads, for system start-up and during high power demands when the main power source is unable to provide the desired power. A fuel cell stack or an engine with a generator provides power to an electric traction system through a DC high voltage electrical bus for vehicle operation. The battery or ultracapacitor provides supplemental power to the electrical bus during those times when additional power is needed beyond what the continuous electric power source can provide, such as during heavy acceleration. For example, a fuel cell stack may provide 70 kW of power. However, vehicle acceleration may require 100 kW of power.

The regenerative power available from an electric traction system during regenerative braking is also used to recharge the battery or ultracapacitor. The ancillary loads of the vehicle and in the case of hybrids and fuel cell vehicles, the engine or fuel cell system, may act as an additional energy sink in case the battery is fully charged. The brake system and the propulsion system may have a brake blending function, which will distribute on driver brake pedal demand the available regenerative energy in an optimum of efficiency and system reliability between the brakes, the battery and the electric loads. Besides alternative propulsion systems, the brake system will have more and more active functions, and if such an active brake in a conventional engine driven vehicle allows brake control without applying the brake pedal, the functions of inversed cruise control can apply also.

An electric vehicle typically is able to provide regenerative braking where the electric traction motor on the vehicle operates as a generator that generates current in response to a driving force on the motor. The regenerative braking energy can be used to recharge the battery or ultracapacitor, or operate system loads.

When a vehicle is traveling downhill, it will typically gain speed. In order to maintain a constant speed and prevent the vehicle from increasing its speed, the vehicle operator may have to operate the vehicle's brakes to prevent the increase in speed. For a conventional vehicle, the vehicle operator can put the vehicle into a lower gear to allow the engine to prevent or reduce an increase in the vehicle speed. Using the brake system has disadvantages because of over-dimensioning the brakes and/or providing additional wear and tear on the brakes. For an electric vehicle, lower gears may not be provided or the electric drive motor may not have an intrinsic characteristic of braking torque. Thus, putting the vehicle in a lower gear to reduce the vehicle speed when traveling downhill may not be an option.

SUMMARY OF THE INVENTION

In accordance with the teachings of the present invention, a method for controlling the speed of a vehicle having a regenerative or active braking capacity when the vehicle is traveling downhill using a cruise control system on the vehicle is disclosed. When brake pedal is applied and the cruise control is set, the vehicle is put into a controlled braking mode. The cruise control system controls are then used inversely to the normal operation where decreases in vehicle speed are provided by applying motoring torque. For the inversed cruise control, increasing the vehicle speed is prohibited by applying more regenerative braking torque.

Additional features of the present invention will become apparent from the following description and appended claims, taken in conjunction with the accompanying drawings.

BRIEF DESCRIPTION OF THE DRAWINGS

FIG. 2 is a graph with time on the horizontal axis and vehicle speed on the vertical axis showing the normal motoring cruise control for a vehicle;

FIG. 3 is a graph with time on the horizontal axis and speed on the vertical axis showing a process for controlling vehicle speed using a braking cruise control method; and FIG. 4 is a flow chart diagram of a method for using a cruise control system on an electric vehicle having regenerative braking to control the speed of the vehicle as it travels downhill.

DETAILED DESCRIPTION OF THE EMBODIMENTS

Figure 1:
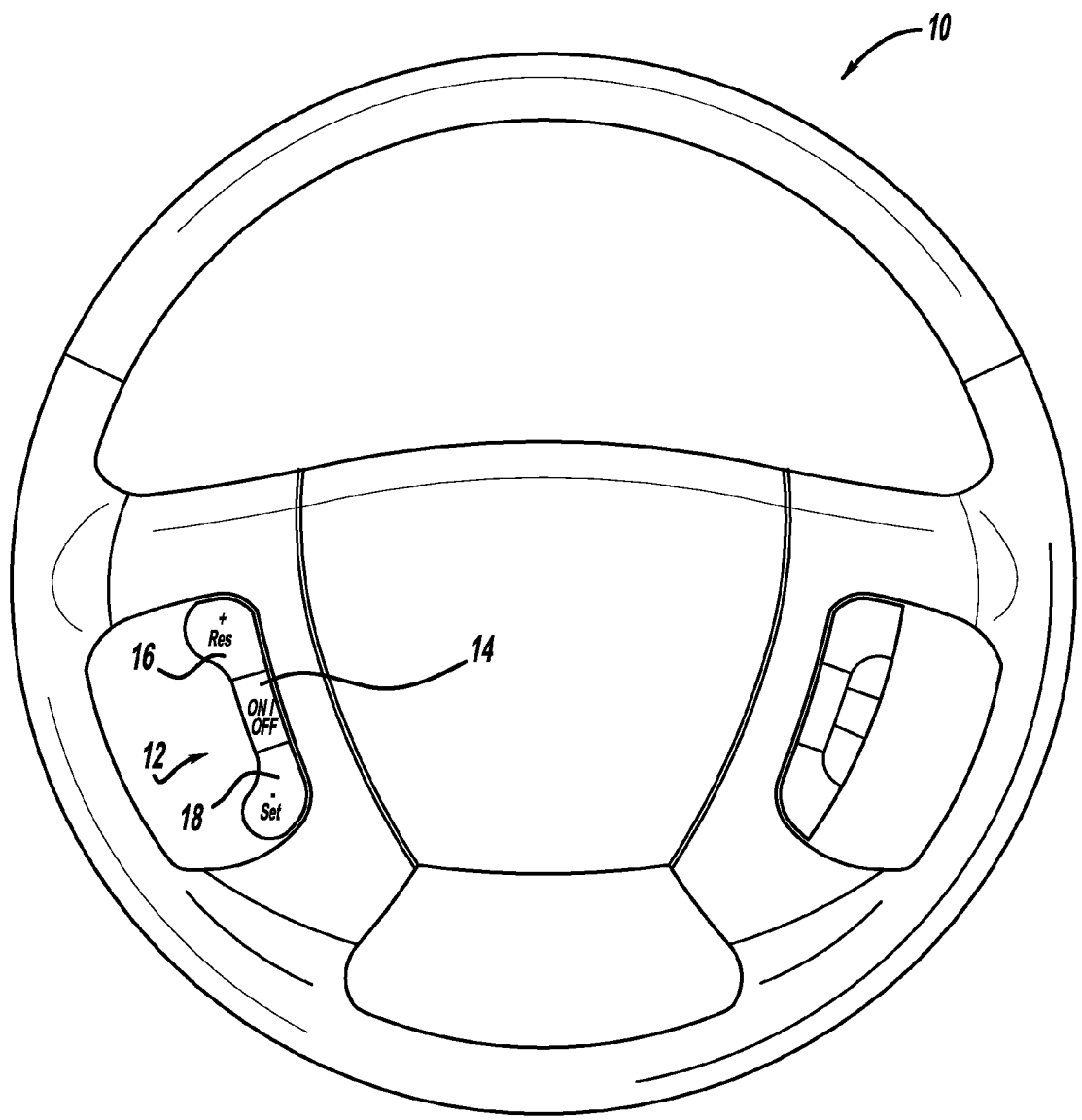
FIG. 1 is an illustration of a control interface for a vehicle cruise control system.

The following discussion of the embodiments of the invention directed to a method for controlling the speed of an electric vehicle traveling downhill having a regenerative braking capability using a cruise control system on the vehicle is merely exemplary in nature, and is in no way intended to limit the invention or its applications or uses.

FIG. 1 is an illustration of a vehicle steering wheel 10 showing a control interface 12 for a vehicle cruise control system. The control interface 12 includes a cruise control on/off button 14 for turning the cruise control system on and off, a resume/accelerate button 16 for increasing the vehicle speed or resuming the cruise control operation and a set/decelerate button 18 for setting the cruise control speed or decelerating the cruise control speed. The operation of a vehicle cruise control system with these control buttons is well understood to those skilled in the art. A brief discussion of this operation will be given below with reference to FIG. 2.

FIG. 2 is a graph with time on the horizontal axis and speed on the vertical axis showing the normal motoring operation of a cruise control system for an electric or non-electric vehicle. Line 22 represents the situation where the vehicle is coasting and the vehicle speed is decreasing, line 24 represents a situation where the vehicle is traveling downhill and the vehicle speed is increasing and line 26 represents the situation where gas is being applied and the vehicle speed is increasing. For any of these situations, the set button 18 may be pushed to set a particular cruise control speed at point 28, where the set speed is identified by line 30. At a hold point 32 an action is performed where the cruise control is disengaged by some operation, such as pressing a hold button, applying the vehicle brakes, etc. The hold button can be an additional button on the control interface 12, or can be a control of one of the existing buttons. The vehicle speed may be changed with the cruise control is disengaged, such as by providing gas at line 34, coasting at line 36 or applying the vehicle brakes at line 38. If gas is applied at the hold point 32, such as to pass a vehicle, then the vehicle operator may lift off of the gas pedal at point 40 and coast at line 42 back to the cruise control mode to resume the controlled speed. If the vehicle is coasting at the line 36 and the resume button 16 is pressed at point 44, then the control will return to the controlled speed line 30 at point 46. If the brake has been applied at the line 38 and the resume button 16 is pressed at point 48, then the cruise control speed will return at point 50. While in the control mode for the cruise control system, the resume/accelerate button 16 can be pushed at point 52 to increase the vehicle speed and the set/decelerate button 18 can be pushed at point 54 to decrease the vehicle speed.

The normal operation of a cruise control system as discussed above can be inverted in an electric vehicle having regenerative braking to be in a regenerative braking cruise control mode to control the vehicle speed using regenerative braking when the vehicle is traveling downhill so that the vehicle does not increase or change its speed. FIG. 3 is a graph with time on the horizontal axis and speed on the vertical axis showing the operation of the cruise control system discussed above for the regenerative braking cruise control mode. In the motoring cruise control mode described above, the cruise control was set at point 28 when the vehicle was coasting or gas was being applied at the lines 22, 24 and 26. For the invention, the cruise control system will know that it is to be put in the braking cruise control mode to control the vehicle downhill speed when the vehicle brake pedal is being applied at line 60 and the cruise control speed is set by the set button 18 at point 62 to set the downhill speed at line 64.

In this design, the cruise control system is using the braking provided by the electric traction motor to control the vehicle speed instead of the throttle to maintain the vehicle speed as the vehicle is going downhill. In other words, now that the vehicle is in the braking cruise control mode, as the vehicle speed increases, more regenerative braking is applied and as the vehicle speed decreases, less regenerative braking is applied as the incline of the hill changes so that the speed of the vehicle is maintained constant.

At point 66, the braking cruise control mode is disengaged by a hold operation, such as applying gas at line 68, applying brake at line 70 or pressing a hold button so the vehicle coasts at line 72. For the gas line 68, throttle is not actually being applied, but braking is being withdrawn so that the speed of the vehicle increases. At point 74, the resume button 16 is pressed so that braking is again applied and the vehicle speed is returned to the selected control speed of the line 64 at point 76. If the vehicle speed has been increasing by the removal of the braking on the line 72 where the vehicle is coasting and the resume button 16 is pressed at point 78, the braking is reapplied and the selected control speed is resumed at point 80. If the vehicle brakes have been applied at the line 70 and then the brakes are disengaged at point 82, then the vehicle coasts at line 84 by the removal of the brakes and braking control is again provided at point 86 to bring the vehicle back to its set control speed. As above, the accelerate button 16 can be applied at point 88 to increase the controlled vehicle speed and the decelerate button 18 can be applied at point 90 to decrease the controlled speed of the vehicle by providing more braking.

FIG. 4 is a flow chart diagram 100 of a method for using a cruise control system on an electric vehicle having regenerative braking to control the speed of the vehicle as it travels downhill. At box 102, it is determined whether braking is being applied to the vehicle. At box 104, it is determined whether the cruise control system has been activated while braking is being applied to the vehicle. When cruise control activation while braking is detected at the box 104, the method proceeds to box 106, where braking from the vehicle propulsion system is used to prevent the vehicle speed from increasing or decreasing while the cruise control system is activated. At box 108, it is determined whether the cruise control system has been deactivated by applying throttle to the vehicle and then speed control is resumed, using propulsion system braking, if a resume button of the cruise control system is pressed. At box 110, it is determined whether the cruise control system has been deactivated by pressing a hold button and then speed control is resumed, using propulsion system braking, if a resume button of the cruise control system is pressed. At box 112, it is determined whether the cruise control system has been deactivated by pressing a brake pedal of the vehicle and then speed control is resumed, using propulsion system braking, after the brake pedal is released. At box 114, when an accelerate button is pressed, propulsion system braking is reduced to increase the speed of the vehicle. At box 116, when a decelerate button is pressed, propulsion system braking is increased to decrease the speed of the vehicle.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for using a cruise control system on an electric vehicle having regenerative braking to control the speed of the vehicle as it travels downhill, said method comprising:
   determining that braking is being applied to the vehicle;
   determining that the cruise control system has been activated while the braking is being applied to the vehicle; and
   using braking from a vehicle propulsion system to prevent the vehicle speed from increasing or decreasing while the cruise control system is activated.

2. The method according to claim 1 further comprising determining that the cruise control system has been deactivated by applying throttle to the vehicle and resuming controlling the speed of the vehicle by propulsion system braking if a resume button of the cruise control system has been pressed after the throttle has been applied.

3. The method according to claim 1 further comprising determining that the cruise control system has been deactivated by pressing a hold button and then controlling the speed of the vehicle by propulsion system braking when a resume button of the cruise control system is pressed.

4. The method according to claim 1 further comprising determining that the cruise control system has been deactivated by pressing a brake pedal of the vehicle and returning to controlling the speed of the vehicle by propulsion system braking after the brake pedal has been released.

5. The method according to claim 1 wherein using the propulsion system brake function to prevent the vehicle speed from increasing or decreasing includes applying more propulsion system braking to prevent the vehicle speed from increasing and removing propulsion system braking to prevent the vehicle speed from decreasing so that the vehicle speed remains substantially constant.

6. The method according to claim 1 further comprising pressing an accelerate button to remove propulsion system braking to increase the speed of the vehicle.

7. The method according to claim 1 further comprising pressing a decelerate button to apply more propulsion system braking to decrease the speed of the vehicle.

8. A method for using a cruise control system on an electric vehicle having a regenerative braking to control the speed of the vehicle as it travels downhill, said method comprising:
   determining that the cruise control system has been activated while braking is being applied as the vehicle is traveling downhill to put the vehicle in a braking cruise control model;
   applying braking torque from a propulsion system as the speed of the vehicle increases as it travels downhill in the braking mode so as to maintain the speed of the vehicle substantially constant;
   removing braking torque from the propulsion system as the speed of the vehicle decreases as the vehicle travels downhill in the braking mode so as to maintain the speed of the vehicle substantially constant; and
   determining that the cruise control system has been deactivated by applying throttle to the vehicle and resuming controlling the speed of the vehicle by propulsion system braking if a resume button of the cruise control system has been pressed after the throttle has been applied.

9. The method according to claim 8 further comprising determining that the cruise control system has been deactivated by pressing a hold button and then controlling the speed of the vehicle by propulsion system braking when a resume button of the cruise control system is pressed.

10. The method according to claim 8 further comprising determining that the cruise control system has been deactivated by pressing a brake pedal of the vehicle and returning to controlling the speed of the vehicle by propulsion system braking after the brake pedal has been released.

11. The method according to claim 8 further comprising pressing an accelerate button to remove propulsion system braking to increase the speed of the vehicle.

12. The method according to claim 8 further comprising pressing a decelerate button to apply more propulsion system braking to decrease the speed of the vehicle.

13. A system for using a cruise control on an electric vehicle having regenerative braking to control the speed of the vehicle as it travels downhill, said system comprising:
   means for determining that braking is being applied to the vehicle;
   means for determining that the cruise control has been activated while the braking is being applied to the vehicle; and
   means for using braking from a vehicle propulsion system to prevent the vehicle speed from increasing or decreasing while the cruise control is activated.

14. The system according to claim 13 further comprising means for determining that the cruise control system has been deactivated by applying throttle to the vehicle and resuming controlling the speed of the vehicle by propulsion system braking if a resume button of the cruise control system has been pressed after the throttle has been applied.

15. The system according to claim 13 further comprising means for determining that the cruise control system has been deactivated by pressing a hold button and then controlling the speed of the vehicle by propulsion system braking when a resume button of the cruise control system is pressed.

16. The system according to claim 13 further comprising means for determining that the cruise control system has been deactivated by pressing a brake pedal of the vehicle and returning to controlling the speed of the vehicle by propulsion system braking after the brake pedal has been released.

17. The system according to claim 13 wherein the means for using braking of a vehicle propulsion system to prevent the vehicle speed from increasing or decreasing applies more propulsion system braking to prevent the vehicle speed from increasing and removes propulsion system braking to prevent the vehicle speed from decreasing so that the vehicle speed remains substantially constant.

18. The system according to claim 13 further comprising an accelerate button to remove propulsion system braking to increase the speed of the vehicle.

19. The system according to claim 13 further comprising a decelerate button to apply more propulsion system braking to decrease the speed of the vehicle.

* * * * *